June 11, 1929.                    E. MARTIN                    1,716,593
                                SHAFT COUPLING
                              Filed Jan. 5, 1926                2 Sheets-Sheet 1
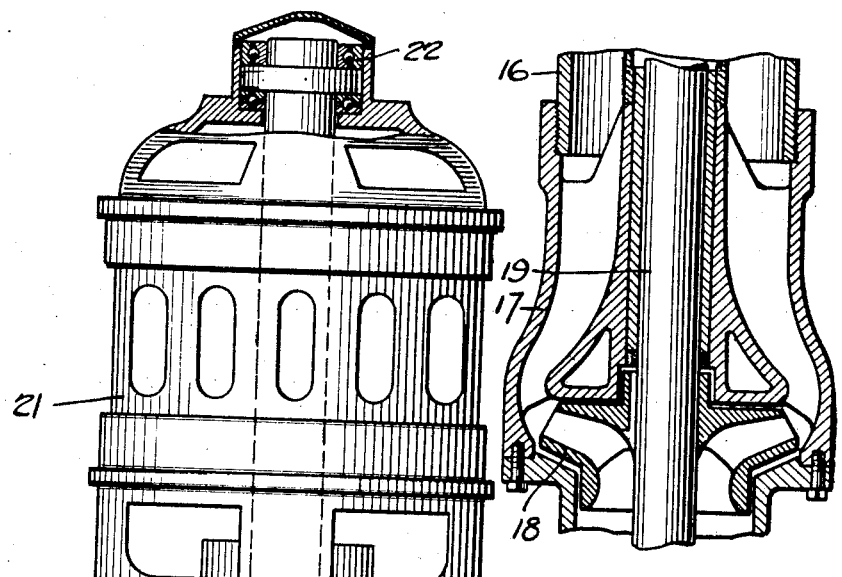
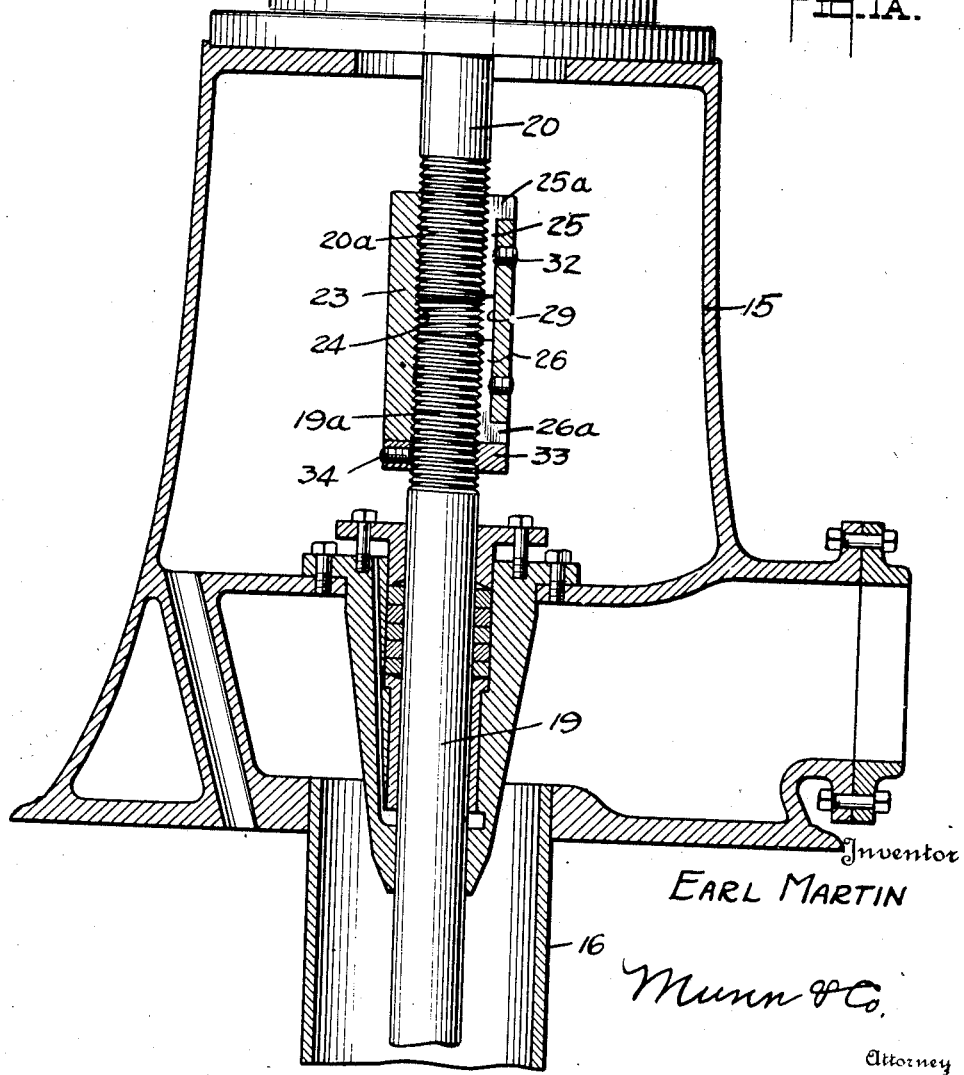
Inventor
EARL MARTIN
Munn & Co.
Attorney June 11, 1929.　　　　　E. MARTIN　　　　　1,716,593
SHAFT COUPLING
Filed Jan. 5, 1926　　　　2 Sheets-Sheet 2
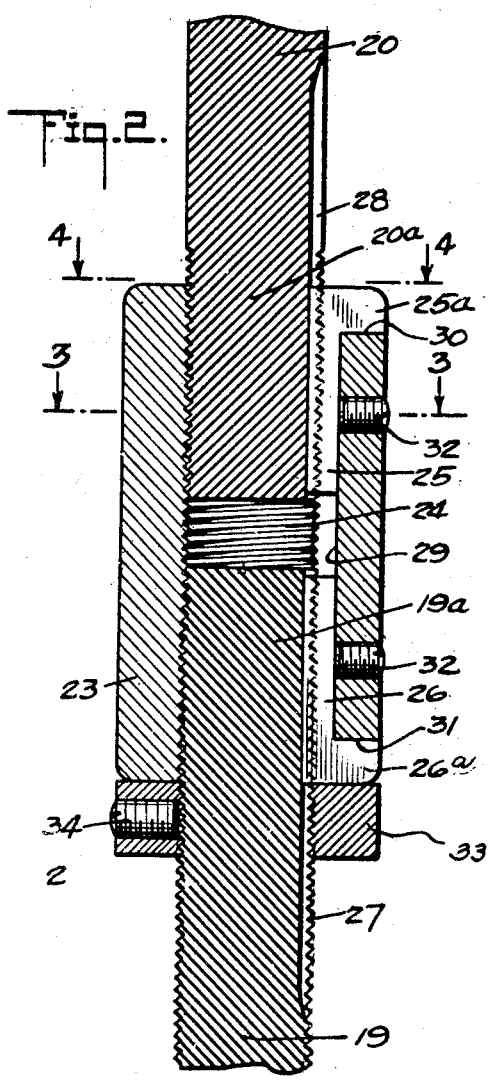
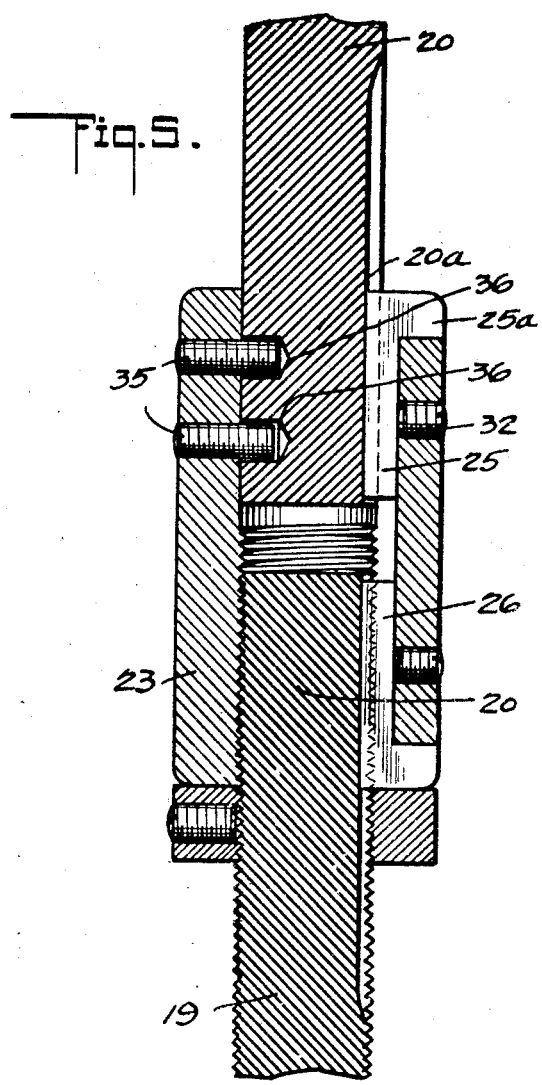
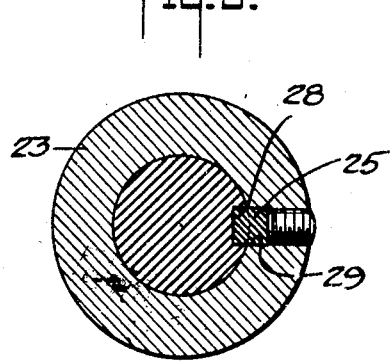
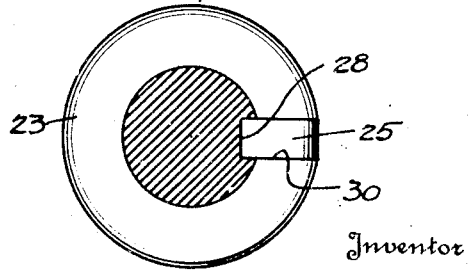
Inventor
EARL MARTIN
By Munn & Co.
Attorney Patented June 11, 1929.

1,716,593

UNITED STATES PATENT OFFICE.

EARL MARTIN, OF SANTA ANA, CALIFORNIA, ASSIGNOR TO ULMER MACHINERY CORPORATION, OF LOS ANGELES, CALIFORNIA, A CORPORATION OF CALIFORNIA.

SHAFT COUPLING.

Application filed January 5, 1926. Serial No. 79,405.

My invention relates to shaft couplings, and it has for its broad purpose the provision of a coupling by which the sections of the shaft can be operatively connected to rotate one with the other, and yet permit, when desired any required adjustment to increase or decrease the over all length of the shaft to allow the adaptation of the shaft to a particular mechanism where an adjustment of the mechanism through the medium of the shaft is necessary to render the mechanism properly operative.

Specifically, my invention has for its purpose the provision of a coupling particularly designed for use in the vertical shafts of rotary pumps where an adjustment of the runners with respect to the bowls is necessary to secure proper operation of a pump and such adjustment is effected through an adjustment in the length of the shaft.

I will describe only two forms of shaft couplings and one adaptation thereof, and then point out the novel features thereof in claims.

In the drawings:

Figure 1 is a view showing in vertical section, and partly in elevation, a conventional form of rotary or turbine pump for wells having applied thereto one form of shaft coupling embodying my invention;

Figure 1$^a$ is a continuation of the lower end of Figure 1;

Figure 2 is an enlarged sectional view of the shaft coupling shown in Figure 1 in applied position to the confronting ends of the pump shaft sections;

Figure 3 and 4 are transverse sectional views taken on the lines 3—3 and 4—4, respectively, of Figure 2;

Figure 5 is a view similar to Figure 2, showing another form of shaft coupling embodying my invention.

Similar reference characters refer to similar part in each of the several views.

Referring specifically to the drawings, and particularly to Figure 1, my invention in one embodiment is shown applied to a conventional form of turbine or rotary pump, as used in elevating water from wells. The pump here shown includes a head 15 positioned at the upper end of a column pipe 16 adapted to extend downwardly into the well and carrying at its lower end a pump casing made up of a plurality of bowls 17 arranged in end to end relation. In the present instance I have shown only one of the bowls, and rotatable in this bowl is a runner 18 fixed to a pump shaft 19 which extends upwardly through the column pipe 16 for operative connection at its upper end to the shaft 20 of a motor 21, the latter being supported upon the head 15, and the upper end of the motor shaft being journaled and supported in a bearing 22.

The motor 21, when operating, is adapted to rotate one or more runners 18 within their respective bowls 17 and through the medium of the shafts 19 and 20. In pumps of this character it is necessary that the runners be definitely spaced with respect to the bottom of the bowls in order that they may have the proper pumping action when rotated, and to effect such an adjustment I have provided a coupling by which the confronting ends of the shafts 19 and 20 may be operatively connected to allow a vertical adjustment of the pump shaft with respect to the motor shaft and yet permit driving of the pump shaft by the motor shaft.

The coupling shown in Figures 1 to 4 comprises a sleeve 23 interiorly screw threaded, as indicated at 24, to receive and have threaded engagement with the confronting threaded ends 19$^a$ and 20$^a$, respectively, of the pump and motor shafts. The sleeve 23 is screw threaded in the same direction from end to end and hence the shaft ends 19 and 19$^a$ are likewise screw threaded in the same direction. Such a construction permits the adjustment of either shaft end within the sleeve to increase or decrease the distance between their confronting ends and in the adaptation shown in Figure 1 allows vertical adjustment of the pump shaft with respect to the motor shaft, so that the runners 18 carried by the pump shaft can be properly spaced with respect to the bowls. Such adjustment can be maintained indefinitely through suitable locking means for the sleeve 23 to prevent relative rotation thereof with respect to the shafts 19 and 20. This locking means in the present instance comprises two keys 25 and 26 at the opposite ends of the sleeve 23, and seated within grooves 27 and 28 formed in the shaft ends 19$^a$ and 20$^a$, respectively, and a groove 29 formed in the sleeve 23. The keys are limited in their inward movement by angular heads 25$^a$ and 26$^a$, respectively, seated within recesses 30 and 31 at the ends of the sleeve 23.

It will of course be understood it is necessary that the grooves 27, 28 and 29 be in registration before the keys 25 and 26 can be inserted therein, but when once inserted the sleeve 23 is effectively locked in its rotation on the shaft ends so as to maintain a definite adjustment of the pump shaft 19. The keys are partly locked against accidental removal by set screws 32, and to provide further means for locking the lower key 26 against displacement a threaded collar or lock nut 33 is threaded on the shaft end 19$^a$, and when properly adjusted has contact with the key head 26$^a$ to lock the key against downward displacement. The lock nut 33 in turn is secured in adjusted position by means of a set screw 34.

Referring now to Figure 5, I have here shown another form of shaft coupling embodying my invention, which is identical to the coupling shown in Figure 2, with the exception that the motor shaft end 20 is without exterior threads, but is locked to the sleeve 23 to rotate the latter by screws 35 threaded in suitable openings in the sleeve and extending into recesses 36 in the shaft end 20$^a$. In this embodiment of my invention the threading of the motor shaft end is eliminated, yet the pump shaft 19 can be rotated within the sleeve to effect vertical adjustment thereof, and in both forms of my invention it will be manifest that through the threaded connection between the shaft ends and sleeve it is possible to effect a most minute adjustment of the shafts to increase or decrease the over all length thereof, yet maintaining proper operative connection between the two. The construction of the couplings is such that the shafts, while being capable of vertical adjustment one with respect to the other, are maintained in true vertical alinement, and the couplings effectively operate to support the weight of the pump shaft and the parts carried thereby.

Although I have herein shown and described only two forms of shaft couplings embodying my invention, it is to be understood that various changes and modifications may be made therein without departing from the spirit of the invention, and the spirit and scope of the appended claims.

I claim:

1. A shaft coupling comprising in combination, alined shaft sections having their confronting ends screw threaded, a coupling sleeve threadedly receiving the threaded shaft ends, said shaft sections at the threaded ends and said sleeve being provided with registering longitudinal grooves, the ends of the sleeve having recesses, and L-shaped keys having portions received in the grooves and other portions received in the recesses.

2. A shaft coupling comprising in combination, alined shaft sections having their confronting ends screw threaded, a coupling sleeve threadedly receiving the threaded shaft ends, said shaft sections at the threaded ends and said sleeve being provided with registering longitudinal grooves, the ends of the sleeve having recesses forming continuations of the sleeve grooves and extending laterally from the latter, L shaped keys having portions received in the grooves of the shafts and sleeve and other portions received in said recesses, and set screws threaded into the sleeve and engaging the first said portions of the keys for securing the latter in locking position.

EARL MARTIN.